United States Patent
Stillig (10) Patent No.: US 11,661,750 B2
(45) Date of Patent: May 30, 2023

(54) METHOD FOR OPERATING A TRACK GUIDANCE SYSTEM AND RAISED FLOOR ELEMENT CONFIGURED FOR THIS PURPOSE

(71) Applicant: Robert Bosch GmbH, Stuttgart (DE)

(72) Inventor: Javier Stillig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 16/830,808

(22) Filed: Mar. 26, 2020

(65) Prior Publication Data

US 2020/0308848 A1 Oct. 1, 2020

(30) Foreign Application Priority Data

Mar. 29, 2019 (DE) ...................... 10 2019 108 353.2
Jun. 13, 2019 (DE) ...................... 10 2019 208 577.6

(51) Int. Cl.
*G05D 1/02* (2020.01)
*E04F 15/024* (2006.01)

(52) U.S. Cl.
CPC .. *E04F 15/02405* (2013.01); *E04F 15/02452* (2013.01); *G05D 1/0234* (2013.01); *G05D 1/0242* (2013.01); *G05D 2201/0216* (2013.01)

(58) Field of Classification Search
CPC ......... E04F 15/02405; E04F 15/02452; G05D 1/0234; G05D 1/0242; G05D 2201/0216
See application file for complete search history.

(56) References Cited

U.S. PATENT DOCUMENTS

| 4,940,925 A | * | 7/1990 | Wand | ................... G05D 1/0282 318/587 |
| 10,477,355 B1 | * | 11/2019 | Niranjayan | ........... A61B 5/1113 |
| 2019/0018382 A1 | * | 1/2019 | Elkmann | .............. G05B 19/048 |

FOREIGN PATENT DOCUMENTS

| DE | 20 2007 017 236 U1 | | 4/2009 |
| GB | 2284636 A2 | * | 2/2011 |
| JP | 2006285635 A | * | 10/2006 |

OTHER PUBLICATIONS

Machine Translation of Description of JP 2006285635 A, Display Guidance Apparatus, Robot System, and Method of Display Guidance in Robot System, 2006 (Year: 2006).*
Machine Translation of Description of JP 2006285635 A, Display Guidance Apparatus, Robot System, and Method of Display Guidance in Robot System, 2006 (Year: 2022).*

* cited by examiner

*Primary Examiner* — Anne Marie Antonucci
*Assistant Examiner* — Jared C Bean
(74) *Attorney, Agent, or Firm* — Maginot, Moore & Beck LLP (57) ABSTRACT

A method for operating a track guidance system including at least one raised floor element includes planning at least one movement of at least one object on the at least one floor element, transmitting at least one control signal for carrying out the planned at least one movement to the object with the aid of an activatable marking on the at least one floor element, and carrying out the planned at least one movement of the at least one object with the aid of an activatable marking on the at least one floor element based upon the at least one control signal.

14 Claims, 4 Drawing Sheets

METHOD FOR OPERATING A TRACK GUIDANCE SYSTEM AND RAISED FLOOR ELEMENT CONFIGURED FOR THIS PURPOSE

This application claims priority under 35 U.S.C. § 119 to application no. DE 10 2019 108 353.2, filed on Mar. 29, 2019 in Germany, and to application no. DE 10 2019 208 577.6, filed on Jun. 13, 2019 in Germany, the disclosures of which are incorporated herein by reference in their entirety.

The disclosure relates to a method for operating a track guidance system comprising at least one floor element on which an object can be moved along a predefinable track. In particular, the disclosure relates to an operating method for raised floor elements of a raised floor and to an operating method for objects (vehicles and, in particular, driverless transport systems) on the raised floor. The raised floor element is equipped, in particular, with integrated additional functions. The disclosure also comprises an arrangement of a plurality of raised floor elements. Very particularly, the disclosure relates to a dynamic track guidance system for driverless transport systems.

BACKGROUND

Floor constructions referred to as "raised floors" are generally used in industrial buildings. In the case of a raised floor, panels which are placed on supports are arranged above an existing floor or above a solid raw ceiling which can be made from concrete, for example. By way of example, reference is made to DE 20 2007 017 236 U1 for further explanation of the general structure of such a raised floor. The supports predominantly have a base plate placed on the lower floor or the raw ceiling. The raised floor panels can be removed. It is easily possible to equip and retrofit the buildings with lines for communication technology and electrical power as necessary with the aid of the raised floors because the lines can be laid in the intermediate space between the floor panels and the building floor. The lines are routed out of the intermediate space through cable bushings arranged on the floor panels.

Modern industrial production systems must be versatile. This means that, in order to produce products in an economical manner and in line with the market, the production systems must often be changed in terms of their configuration with respect to one another, but also in their spatial position. This problem occurs not only in a production environment which has already been used for years ("brownfield") but also even in new installations ("greenfield"). This results in the entire infrastructure which supplies the production system having to be adapted to the new configuration. Nowadays, the existing supply devices are typically dismantled to a particular point, the production installation is moved and a new media supply is then set up. The problem of dismantling and reconstruction is disadvantageous, in particular, for production systems of a defined size (power, weight, dimensions) and function.

Such a raised floor element can be equipped with integrated additional functions, in particular for use in industrial environments. This has the advantage that, in addition to the actual function (providing a space which is accessible at any point below the raised floor), further additional functions are integrated. It is advantageous, in particular, that, in a structurally elegant manner, the raised floor element does not need to be moved if production is reorganized, but rather can remain at its location, and only the functions of the functional elements in or on the raised floor element need to be changed. This makes it possible to flexibly reorganize the production devices. Another particular advantage is that the amount of time and work needed to reorganize production is significantly minimized.

In this case, an upper floor panel may form a flat termination of the raised floor element and is, in particular, suitable and configured to serve as a walkway for persons, a route for vehicles and/or a set-up area for machines. The floor panel may be at least partially transparent.

In particular, a track guidance system for driverless transport systems can be provided here.

A track guidance system can be provided with optical sensors and actuators and may be configured for applications in the industrial environment.

Depending on the space situation and/or the number or density of travel movements on such a floor, collisions can occur and can trigger a risk for the vehicles, their conveyed material and/or the personnel.

SUMMARY

On the basis of this, the object of the present disclosure is to alleviate or even avoid the disadvantages mentioned. In particular, the disclosure is to specify an improved track guidance system.

These objects are achieved with a method for operating a track guidance system, a raised floor element and a raised floor according to the disclosure. It should be pointed out that the description, in particular in connection with the figures, states further details and developments of the disclosure which can be combined with other features from the disclosure.

A driverless transport system can move on a line applied to an "intelligent" floor and can thus find its way through the area. The driverless transport system is oriented only by an LED segment as part of its route. The route is determined in the superordinate control unit and is displayed on the intelligent floor in sections. Visually, this type of driverless transport system guidance can be imagined as an "electronic dog leash" in which the speed and/or direction of movement of the LED strip correspond(s) to that/those of the driverless transport system.

Since track guidance systems are of a static nature, further problems can arise. The guidance of a driverless transport system, in the form of a line applied to the floor, is fixed in terms of its position. If a driverless transport system is now intended to be controlled on different paths through a production environment, turnoffs need to be applied to the floor. In addition, an item of information relating to which turnoff should be followed must be transmitted to the driverless transport system by the superordinate control unit. In order to meet the requirements for versatile production in which logistics paths can continuously change, many lines must therefore be applied to the floor.

This problem occurs not only in a production environment which has already been used for years but even also in new installations. Therefore, intensive work is being carried out on the topic of "localization and orientation". An attempt is made to solve the given problem by enabling the driverless transport system to create its own environmental map by means of laser scanners and further localization systems. This on-board map is then used for orientation and route planning. However, the technology required for this purpose is complicated and expensive, with the result that large-scale use of driverless transport system technology becomes an investment-intensive project.

Control and localization of the driverless transport systems therefore contribute to the solution, in which case the data and instructions obtained are transmitted to the central dynamic track guidance system. As a result of the fact that a light-emitting diode strip with individually controllable LEDs, for example, is applied to the floor and is connected to the control and communication unit, a display configuration which can be changed at any time can be presented on the LED strip. The luminous color and brightness of the LEDs can also be adjusted. Any desired other optically acting display means can nevertheless be used for this purpose.

If not only one LED strip, but rather a plurality of LED strips are now applied to the floor, for example at a right angle with respect to one another, for the track guidance of a driverless transport system, a wide variety of travel tracks can be produced on the checkered structure produced in this manner. If this structure is applied to the entire area of production, it is possible to dynamically change over logistics paths.

A method for operating a track guidance system, comprising at least one floor element, in particular at least one raised floor element, consequently contributes to the solution, at least having the following steps of:
a) planning at least one movement of at least one object on the at least one floor element,
b) transmitting at least one control signal for carrying out the planned movement to the object with the aid of an activatable marking on the at least one floor element.

A movement or a route of the at least one object can be planned centrally or in a superordinate control unit. It is also possible for the route planning to be at least partially carried out in a computing unit in the object and/or the floor element. It is also possible for the planning to be able to be at least partially specified via a terminal on the object and/or floor element. The result of such planning is possibly a specific route/movement specification, along which the object is intended to independently move to the destination to be approached. The route or movement specification can be partially or completely stored.

The at least one floor element comprises an activatable and deactivatable marking, in particular in or on the formed floor over which the object is guided. The activation and deactivation can be electronically specified. The marking can consequently be discernible for the object (by sensors) in the activated state and can remain unnoticed in the deactivated state.

On the basis of the planned movement or the route/movement specification, a control signal can be emitted by the floor element by means of the marking, to which control signal the object is responsive and/or which control signal is in the form of a guidance signal for the movement of the object.

The object, such as, in particular, a floor-based driverless transport system, can follow the activated markings and can cover the planned movement or route in this manner. It goes without saying that other driverless transport systems can also be used here as an object in this sense. However, insofar as the disclosure is explained below with reference to a driverless transport system, this should not be understood as restrictive for the use in other objects.

A driverless transport system can move on a line/line segment applied to the floor and can therefore find its way through the area.

The floor element is, in particular, part of an intelligent raised floor on which driverless transport systems can be moved, in which case this movement is controlled by the superordinate controller with the aid of the raised floor. Driverless transport systems are also referred to below as objects which are moved on the raised floor.

Before step a), a position of the object on the at least one floor element is preferably captured, wherein the movement is planned taking into account the captured position. It is possible, for example, to determine the current position of the object in the space or on the floor by means of a positioning system. A radio signal can be used for this purpose. The coordinates or the position of the object can therefore be accurately determined and can then be made available to step a). The determined position could be used as the "starting position" for the movement planning. The associated floor element, starting from which the route is specified, could therefore also be determined.

A position of the object can be captured with the aid of at least one position capture device of the at least one floor element. For this purpose, the floor element can be equipped with a sensor system which captures the presence of an object in the environment of the floor element. Contacting and/or contactless sensors may be part of the position capture device for this purpose. In particular, this position capture device uses a light-responsive sensor system (including UV, infrared and the like). The position capture device is preferably installed in the floor element.

Additionally or alternatively, a position of the object can be captured with the aid of at least one position capture device which is outside the floor element or raised floor. External radio antennas or the like, for example, which are fitted in the environment of the floor elements and/or only (independently operated) on individual floor elements could be used for this purpose.

The above position capture devices may be part of the positioning system for objects. Signals from the position capture device can therefore also be communicated to a superordinate control center which possibly commissions and/or carries out the planning of the movement therefrom.

The activatable marking expediently comprises a matrix and/or a linear code of activatable marking elements which is used to transmit a control signal. In this case, a matrix relates, in particular, to an areal formation of a signal pattern. In this case, a linear code relates, in particular, to a linear formation of a signal pattern. The signal pattern can be achieved, for example, by virtue of the fact that a plurality of marking elements, for example LEDs, are combined with one another in the specified marking area or line and are (differently) activated and/or deactivated in a targeted manner and in dependence on one another.

The control signal is preferably coded using the marking elements. Consequently, (differently colored) LEDs can be used to create a plurality of patterns which can be read by the object over a specified area and/or line. Control signals (for example "forward", "to the right", "slower", "stop", "give way", "destination reached", etc.) and therefore also movement specifications for the object can then be assigned to the respective pattern. This increases the flexibility and redundancy of the control signals.

At least one of the following parameters is preferably used for coding:
color of an optical marking element,
flashing frequency/sequence of an optical marking element, and
brightness of an optical marking element.

At least one of the marking elements provided for the activatable (optical) marking can contribute to a color change of the marking. Differently colored LEDs or a color-changing light source may thus be provided, for example. In a similar manner, a brightness of the activatable (optical) marking can also be changed by dimming and/or switching light-emitting means on/off.

The change can be effected at predefinable times, with an intensity transition and/or in a flashing manner (that is to say at a frequency of greater than 1/s, for example).

It is possible for the color, brightness and/or flashing frequency to vary over an (individual) pattern or an (individual) code. It is therefore possible to transmit a course, a speed or acceleration instruction and/or an item of direction information (in a manner which can be captured automatically).

A further aspect proposes a raised floor element for a raised floor, at least comprising an upper floor panel, at least one functional element which can be actuated by a control device, and at least one connecting element for connection to at least one further raised floor element, wherein the functional element is a row or a matrix of activatable markings which can be used to indicate a region (for example in the form of a track, a matrix and/or a linear code) on the raised floor element.

The raised floor element is configured, in particular, for use as a "floor element" in the sense of the method proposed here for operating a track guidance system for an object. In this respect, the statements made above with respect to the floor element can be used for the supplementary description and vice versa.

The object can be designed with a track guidance sensor, for example at least one camera which can detect, in particular, both the brightness differences in the activatable marking and its luminous color and can communicate them to the control system of the object.

The activatable markings preferably comprise light-emitting means. A multiplicity of light-emitting means are preferably provided and can together show different tracks, patterns and/or codes. The light-emitting means can preferably emit light in the visible range, in the infrared range and/or in the ultraviolet range.

The raised floor element preferably has at least one sensor as a functional element, which sensor is configured, in particular, to capture objects and particularly preferably to capture movements of objects. The sensor can be in the form of a load cell and can detect/identify objects by their weight, for example. The sensor is preferably provided below the raised floor element, with the result that position capture through the floor is enabled, in particular.

The raised floor element advantageously has at least one energy supply module for supplying energy to the at least one activatable marking and possibly to further functional elements of the raised floor element. The at least one energy supply module is configured, in particular, to provide the activatable marking with energy in a targeted manner as specified by the control device, with the result that this is variable here according to the explanations. The energy supply module is itself preferably connected to a central energy depot, from which a plurality of raised floor elements are supplied.

Yet another aspect proposes a raised floor comprising at least two raised floor elements, in particular configured to operate a track guidance system according to the disclosure. This means, in particular, that a plurality or even a multiplicity of such raised floor elements are connected to one another (in a modular manner) and can interact with one another in a coordinated manner. An "intelligent" floor is then formed, on which driverless transport systems can move in an area.

The raised floor expediently has a superordinate control unit (also possibly in the form of a control center) for carrying out the method proposed here. The control device can be configured, in particular, in such a manner that it can adjust the operation of the markings of a plurality of floor elements in a coordinated manner and/or can carry out position capture of at least one object (with respect to the floor elements).

The disclosure comprises, in particular, a system in which an object follows a track displayed on the floor. The displayed track comes from a path planning system in this case. The track to be displayed is communicated to the individual floor tile (floor element) by the path planning system. The path planning system may be centrally present and may control the paths of a plurality of vehicles. The path planning system could also be implemented in the vehicle itself and could specify the path of a vehicle on the basis of the tile grid. The accurate guidance is ensured by displaying the track on the tile and by the detection and following algorithm of the vehicle.

BRIEF DESCRIPTION OF THE DRAWINGS

The disclosure and the technical environment are also explained in more detail below on the basis of figures. In this case, identical components are indicated using identical reference signs. The illustrations are schematic and are not intended to illustrate proportions. The explanations stated with respect to individual details of a figure can be extracted and can be freely combined with substantive matter from other figures or the description above unless something else necessarily arises for a person skilled in the art or such a combination is explicitly prohibited here. In the drawings.

DETAILED DESCRIPTION

Figure 1:
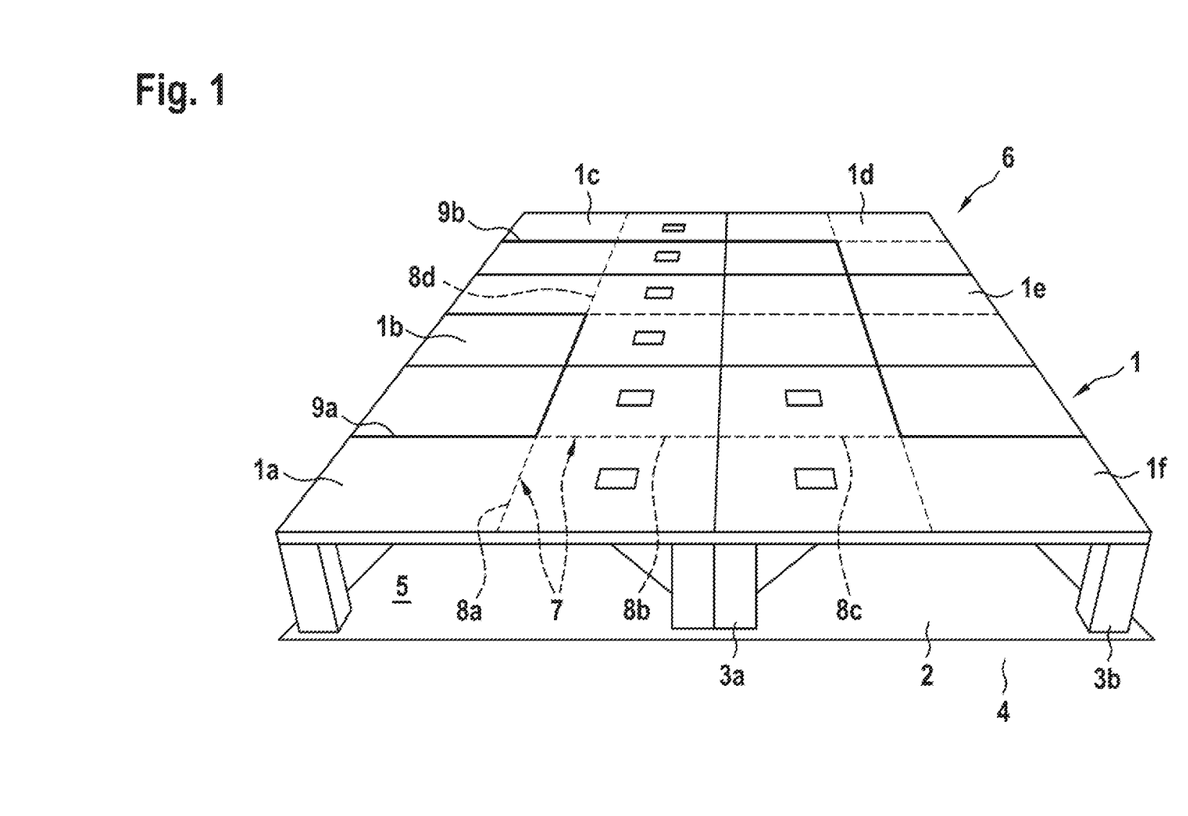
FIG. 1: schematically shows functional patterns of an intelligent floor having a dynamic track guidance system using the example of a raised floor comprising a plurality of raised floor elements.

FIG. 1 shows a functional pattern of an intelligent floor having a dynamic track guidance system using the example of a raised floor comprising a plurality of raised floor elements.

According to FIG. 1, a raised floor element 1 of a raised floor 6 consists of a floor panel 2 which rests, at the corners, on a frame element 3 in the form of supports 3a, 3b, for example metal supports, which support the floor panel 2 above a raw floor 4, for example made of concrete. The floor panel 2 is arranged at a distance from the raw floor 4 with the aid of the supports 3a, 3b, with the result that a free space 5 (intermediate space) is formed between the raw floor 4 and the floor panel 2.

The "intelligent" floor may be a raised floor 6 made of individual tiles or elements (raised floor elements 1; 1a to 1n) which have integrated additional functions, for example embedded LEDs as a visualization function or as activatable markings 7 with marking elements 7a to 7n. The term "LED" is used synonymously below for any desired type of activatable optical marking 7. Depending on the selected expansion stage, the LEDs can be organized in this case as LED strips and/or as an LED matrix (see FIG. 1). In this example, the primary function of the LEDs is, on the one hand, the marking of pathways for human workers (cf. FIG. 1 where such a raised floor 6 is shown). Additionally or alternatively, the LEDs can be used as a dynamic track guidance system for track-guided driverless transport systems (see 11; 11a to 11n). Such driverless transport systems can be referred to and considered as objects 10; 10a to 10n which are moved on and/or over the raised floor 6.

LED lights (activatable markings 7 with activatable marking elements 7a to 7n) below the driverless transport system are preferably activated in a defined color sequence or preferably emit light there such that the driverless transport system experiences both direction and acceleration control. The activatable markings 7 are therefore used to transmit control information to the driverless transport system.

An exemplary implementation is illustrated in FIG. 1 below. It shows a functional pattern of an "intelligent floor" in which a dynamic track guidance system is implemented. Four LED strips (8a, 8b, 8c, 8d) are each embedded as activatable markings 7 in the 6×1 m$^2$ raised floor elements 1a to 1f in the form of a cross. In this case, the individual panels are positioned with respect to one another in such a manner that the LED strips 8a, 8b, 8c, 8d result in a checkerboard pattern.

If the individual LEDs in the strips 8a to 8d are now switched on in a suitable manner, a system of lines is formed on the floor, for example the raised floor 6. Two lines 9a, 9b are shown in a bright color, by way of example, in FIG. 1. These lines 9a, 9b can now serve conventional line-guided driverless transport systems 11a to 11n (see FIG. 2) as a track.

It is not necessary for the dynamically generated lines 9a, 9b to be presented as a completely self-contained track on the floor. It is sufficient, in particular, if only that part which is currently being crossed by the respective driverless transport system is presented on the floor. This procedure minimizes the energy costs for displaying the travel track and increases the service life of the engaged LED.

In addition, the technology used in the driverless transport system can be significantly reduced by dispensing with laser scanners, mapping, on-board computers and the like, or significantly reducing the functionality thereof. It is sufficient to equip the driverless transport system with a simple (in particular optical) track guidance system.

A track guidance sensor 12 (see FIG. 3), for example a camera, can be used to guide the driverless transport system along the line 9a, 9b displayed on the floor. An integrated computing unit 13 (for example part of the floor element's own control device 23) evaluates the position of the detected line 9a, 9b in the camera image and provides its position relative to the center of the image. Deviations from the center of the line are transmitted to the controller 14 inside the driverless transport system (for example by radio or by means of the marking itself) and result in the course being corrected.

Turnoffs and crossings in the course of the track of the driverless transport system are likewise unproblematic and can be implemented in the driverless transport system control behavior in various ways. A possible solution is to have the driverless transport system turn left or right at a turnoff by activating a turning lighting or LED strip.

If the lighting or LED strips 8a to 8d are laid in a checkerboard pattern for example, provision may be made for two LED strips 8a to 8d which meet in a perpendicular manner to be activated at their point of intersection. For this purpose, a certain number of LEDs before and/or after the turnoff point will light up in (a different) color in order to thus signal a change of direction to the driverless transport system.

Furthermore, in addition to the information relating to the indication of the direction of travel, it is also possible to transmit start and stop commands in order to control the driverless transport system. For this purpose, for example, the LEDs along the travel track in the direction of travel can be switched on at defined times and can be switched off again after they have been driven over. Viewed from the outside, there is the impression of the driverless transport system being pulled on a visual "leash". The faster the LED section moves on the floor, the more quickly the driverless transport system moves. If the LED section slows down, the driverless transport system also decelerates. A standstill of the LED section would be synonymous with the driverless transport system stop.

The direction of travel and/or the travel speed can be specified using the raised floor 6 or an "intelligent" floor.

Figure 2:
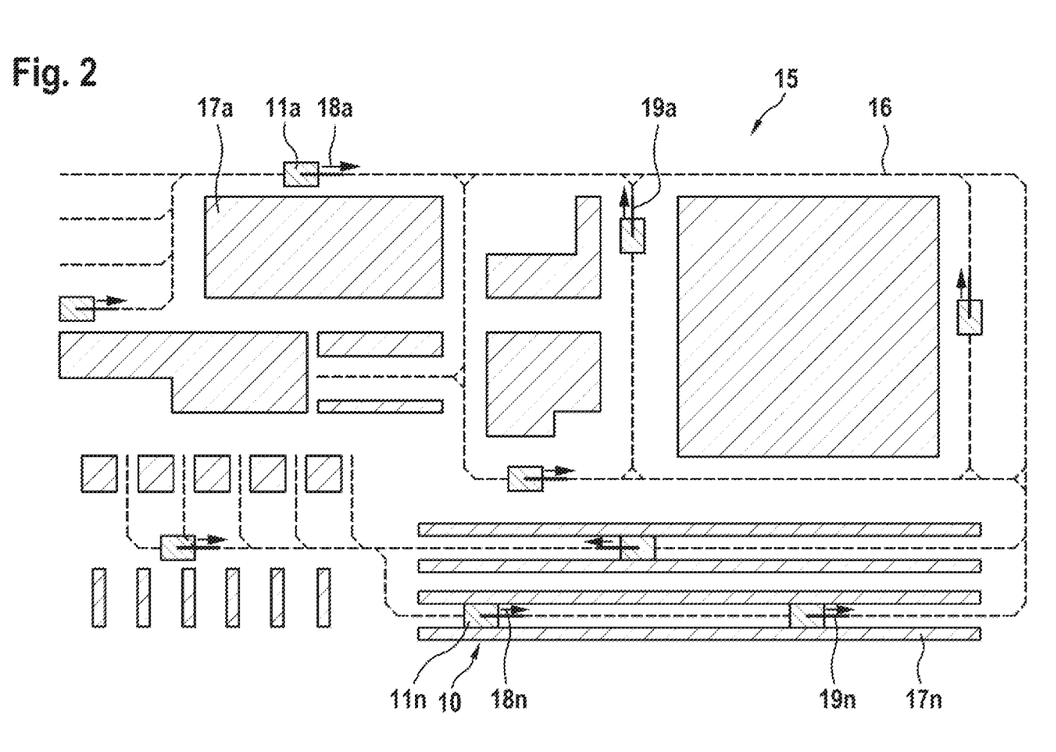
FIG. 2: schematically shows the structure of a driverless transport system route in a production environment.

FIG. 2 shows, schematically and by way of example, a structure of a driverless transport system route in a production environment. In this case, the route elements 16 are depicted as dashed lines. They surround the production systems 17a to 17n which are illustrated as hatched rectangles. A rectangle on the dashed line symbolizes the object 10 or driverless transport system 11 which is indicated by a direction arrow in its direction of travel 18a to 18n. The line 19a to 19n which centrally projects somewhat in the direction of travel in front of and below the driverless transport system is intended to indicate the currently active dynamic track guidance system light-emitting segment (or raised floor element 1a to 1n).

A functional principle of the visual "leash" is described below on the basis of the driverless transport system shown schematically and in an enlarged manner in FIG. 3.

Figure 3:
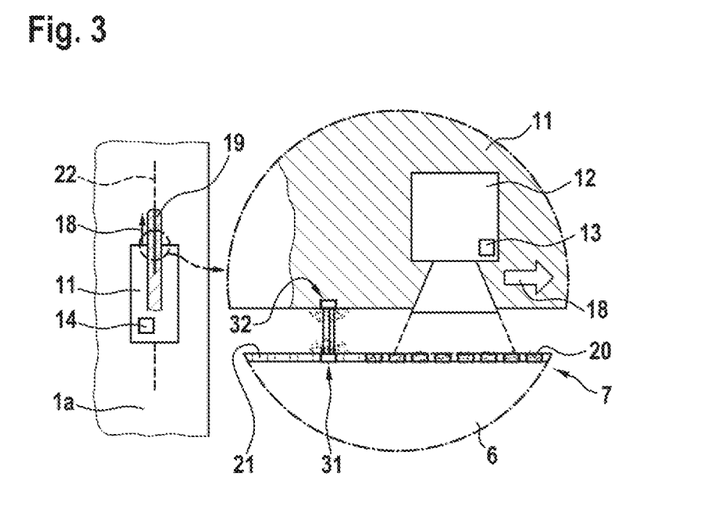
FIG. 3: schematically shows a driverless transport system on the dynamic track guidance system.

FIG. 3 shows, in particular, a driverless transport system in a dynamic track guidance system, wherein a section from FIG. 2 with a plan view of a driverless transport system 11 is illustrated on the left and a side view of a driverless transport system 11 and of the dynamic track guidance system (7) embedded in the floor is illustrated in an enlarged manner on the right.

The dynamic track guidance system embedded in the floor provides an LED section for the track guidance of the driverless transport system moving on the floor.

In this example, eight colored LEDs 20 are activated for track guidance. The example shows a track guidance sensor 12 which is permanently installed in the center of the width of the driverless transport system. In this case, this track guidance sensor 12 may be at least one camera which can detect, in particular, both the brightness differences in the LED strip and their luminous color and can communicate them to the driverless transport system control system 14.

The track guidance sensor 12 now keeps the driverless transport system in the center of the LED travel track 22, on the one hand, and keeps the LEDs in the center of its image in the direction of travel 18 of the driverless transport system, on the other hand.

If a deviation from the center of the LED strip to the left is detected using the track guidance sensor 12, for example, a compensation movement of the driverless transport system to the right is carried out until the active LEDs are in the center of the image from the track guidance sensor 12 again.

If the driverless transport system is too slow in relation to the moving LED section, the driverless transport system is accelerated via its drive until the LEDs are in the center of the image from the track guidance sensor 12 again.

It should be noted that the dynamic track guidance proposed here is not only dependent on optically visible signal sources, but other wavelengths of the electromagnetic spectrum, for example infrared, are likewise possible as the guide element.

The practical implementation and the connection of the LED display to further functions favor the use of RGB(W) LED strips (=polychromatic LED strips, the LEDs of which can be individually controlled, in terms of their color and brightness, via a data bus).

The dynamic track guidance system for driverless transport systems 11a to 11n, in particular for use in industrial environments, is preferably designed with individually controllable light-emitting diodes 20, 21 which are combined to form a light-emitting diode strip 8a, 8b, 8c, 8d and form a travel track 22 for optically controlled driverless transport systems 11a to 11n.

Figure 4:
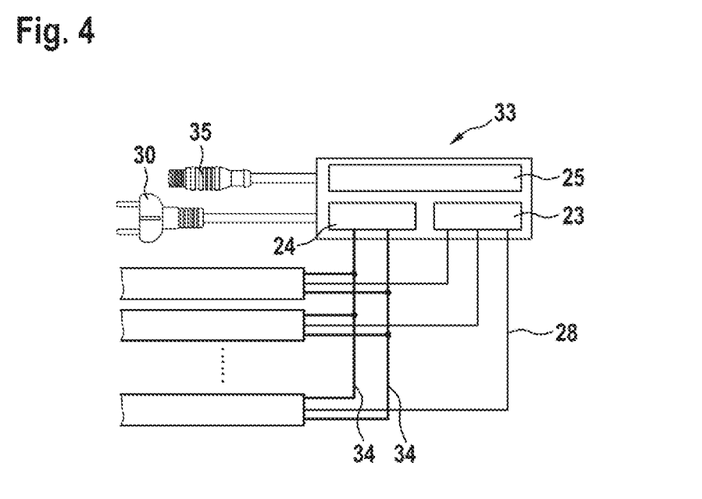
FIG. 4: schematically shows parts of the dynamic track guidance system.

FIG. 4 shows, by way of example, the basic parts of the dynamic track guidance system.

Energy Supply, Control and Communication Unit 33:

The energy supply, control and communication unit can comprise at least one energy supply unit 24 (energy supply module), a control unit 23 and/or a communication unit 25 which allows connection to an industrial field bus system 29, for example SERCOS III, EtherCAT or Profi-Safe. The connection to conventional Ethernet networks, as are used to network office networks, is likewise conceivable if the real-time capability and/or safety-relevant aspects of the track guidance system play a subordinate role.

The energy supply unit 24 can have the task of supplying the LED strips 8a to 8d with electrical energy completely or in sections via energy lines 34. Using the example of the functional pattern of the intelligent floor (FIG. 1), the supply, together with the control unit 23 and the communication unit 25, is integrated in a raised floor element 1; 1a to 1n in a modular manner. The raised floor elements are connected to the supply network via an energy bus 30, for example a looped-through line or a busbar.

The control device 23 is a central module of the dynamic track guidance system. It ensures the movements of the driverless transport systems used by switching the individual LEDs 20, 21 in the LED strips 8a, 8b, 8c, 8d on and off in a manner specific to the driverless transport systems in terms of color and/or in a time-synchronous manner.

As described above, the LED strip 8a, 8b, 8c, 8d can be operated not only as a pure actuator but also as a combination of a sensor/actuator element by incorporating a suitable sensor system (also see the following section on the position capture device).

In this case, the control device 23 operates in a bidirectional manner, in particular.

A communication unit 25 is provided for the purpose of connecting the control device 23 to a superordinate control unit 26. This communication unit has the task of transmitting commands and status messages of the dynamic track guidance system to connected network partners. Such a network partner could be, for example, a logistics system which receives a manually generated transport request via a manual workstation. It goes without saying that the M2M (machine-to-machine, production machines capable of communication) can also automatically generate such a transport request and can transmit it to the logistics system. Depending on the requirements imposed on the travel operation of the driverless transport systems, real-time-capable and secure communication via a suitable field bus is recommended.

Figure 5:
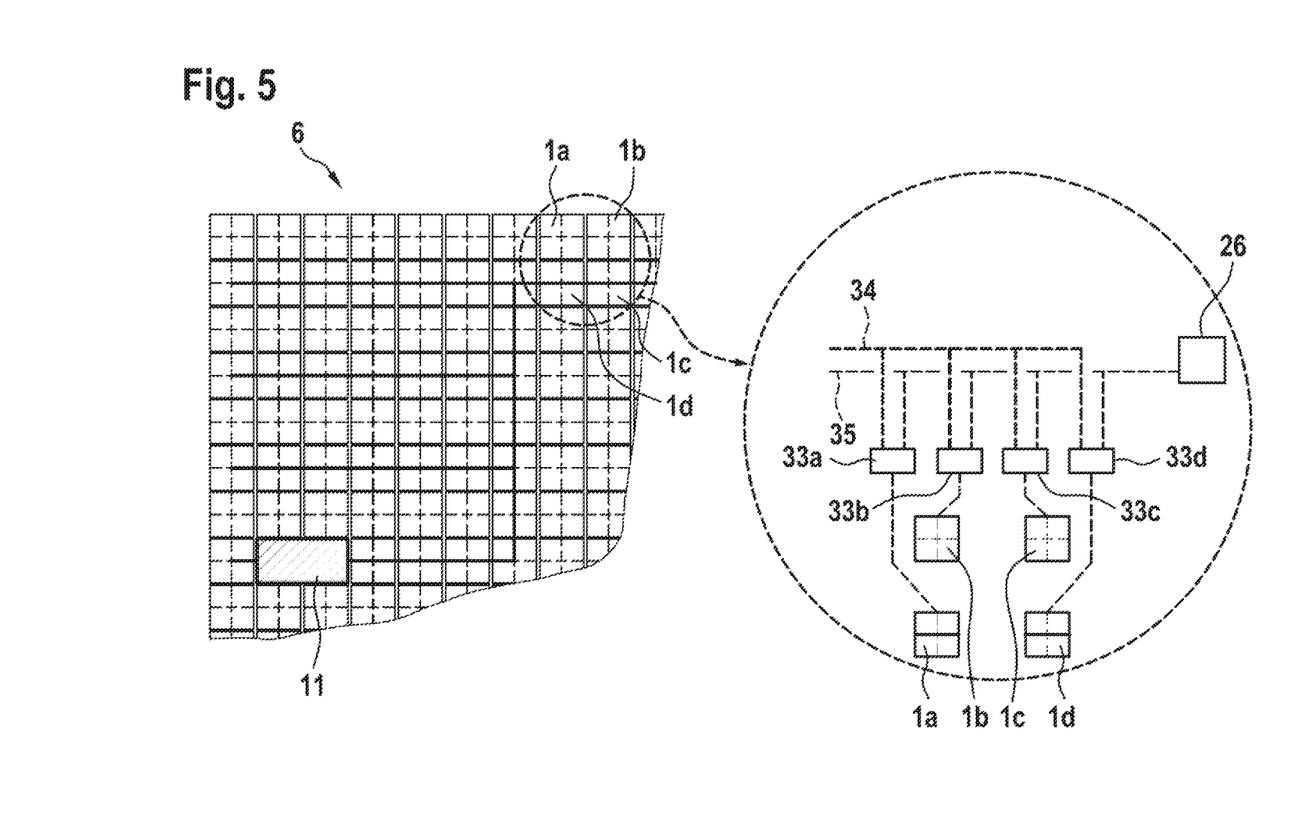
FIG. 5: schematically shows the automation structure of the dynamic track guidance system using the example of the intelligent floor.

FIG. 5 illustrates an automation structure of the dynamic track guidance system using the example of the intelligent floor.

One example for implementing an energy supply, control and communication unit for modular use in the intelligent floor, for example raised floor 6, is shown in FIG. 5.

For each raised floor element 1; 1a to 1n, there is an energy supply, control and communication unit 33a to 33n (or a control device 23) which is connected to a superordinate control unit 26, the so-called grid controller, via an Ethernet network. Display scenarios defined by the person or by other machines can now be requested on the grid controller. These requests are preprocessed in the grid controller, transmitted to the energy supply, control and communication unit of the raised floor element as a specific command and displayed on the cruciform LED strip 8a to 8n.

An energy supply, control and communication unit 33 in which travel commands are transmitted to the driverless transport system via the dynamic track guidance system by suitably switching on the LEDs 20, 21 via the control device 23 is particularly preferred. In this case, the energy supply, control and communication unit operates in a bidirectional manner and can also receive status messages from the driverless transport system and can forward them to a superordinate control unit 26 by means of the communication unit 25, for example. An energy supply unit 24 is provided for the purpose of supplying energy to the LEDs 20, 21.

Position Capture Device:

The position capture device is used to capture the positions of the driverless transport systems on the LED strips 8a to 8n. If a driverless transport system is deliberately or unintentionally disconnected from the track guidance system, this operation can be detected by means of the position capture device and suitable measures, for example the alerting of a logistics employee, can be initiated. The position capture device likewise is used to insert the driverless transport system into the track guidance system. In this case, the insertion point may be one or more defined points within the driverless transport system route 15 or else any desired points on the route.

The position capture device preferably comprises a suitable sensor system which allows the driverless transport system to be located on the LED strip 8a to 8n.

This problem can be solved, inter alia, by means of infrared diodes.

In this case, the receiving diode 31 is positioned in or on the LED strip 8a to 8n and is cyclically queried by the energy supply, control and communication unit (or by the control device) for the presence of a driverless transport system. The driverless transport system is in turn equipped with an infrared transmitting diode 32 which is placed at a suitable location on the driverless transport system. The energy supply, control and communication unit recognizes a driverless transport system as present if the receiving diode 31 embedded in the floor receives a driverless transport system code. In addition to the unique driverless transport system identifier, this code can then also transmit further status information, for example the remaining battery capacity or service messages, to the dynamic track guidance system.

In order to verify the driverless transport system and to determine its position, the code (in the control device 23)

received from the dynamic track guidance system is checked in a two-sided "handshake" method and the receiving location is relayed to the grid controller (superordinate control unit 26). After authentication, the dynamic track guidance system responds, for example, with a defined flashing sequence at the receiving location, which is in turn detected by the track guidance sensor 12 of the driverless transport system. A confirmation message from the driverless transport system via the infrared transmitting diode 32 changes the driverless transport system and the local dynamic track guidance system to operational readiness.

It goes without saying that the position capture device can also be operated at a wavelength other than the infrared wavelength. The wavelengths of the visible range or else electromagnetic radio radiation, for example RFID in the 13.56 MHz band, are also possible, for example. Local electromagnetic fields likewise come into consideration as a possible solution for the position capture device. The implementation of communication between the driverless transport system and the dynamic track guidance system by means of infrared diodes has the advantage that corresponding diodes are convenient to procure and integrate, on the one hand, and are also not influenced by the optically visible track guidance signals.

A preferred position capture device 27 is configured in such a manner that the dynamic track guidance system has a suitable sensor system, for example infrared receiving diodes 31 which detect when a driverless transport system approaches and/or drives over and forward this to the control and communication unit 33. In this case, the position capture device is preferably integrated in the light-emitting diode strip 8*a* to 8*d*.

The system described here involves, in particular, a robot vehicle or a driverless transport system following a track displayed on the floor as exactly as possible. In this case, the displayed track comes from a path planning system. The track to be displayed is communicated to the individual floor tile (raised floor element) by the path planning system.

The path planning system can be centrally present and can control the paths of a plurality of vehicles, for example driverless transport systems 11*a* to 11*n*.

The path planning system could also be implemented in the vehicle itself and could specify the path of a vehicle on the basis of the tile grid.

The "centimeter"-accurate guidance can be ensured by displaying the track on the tile and by the detection and following algorithm of the vehicle.

The (possibly abstracted) method steps proposed here can be implemented as a computer-implemented method. It is therefore also possible to implement a data processing system which has means for carrying out the (possibly abstracted) method steps proposed here.

LIST OF REFERENCE SIGNS

1 Raised floor element
1*a* to 1*n* Raised floor elements
2 Floor panel
2*a* to 2*n* Floor panels
3 Frame element
3*a*, 3*b* Supports
4 Raw floor
5 Free space
6 Raised floor
7 Activatable marking
7*a* to 7*n* Activatable marking elements
8*a* First lighting or light-emitting diode strip
8*b* Second lighting or light-emitting diode strip
8*c* Third lighting or light-emitting diode strip
8*d* Fourth lighting or light-emitting diode strip
8*a* to 8*n* Lighting or light-emitting diode strips
9*a*, 9*b* Dynamically generated lines
10 Object
10*a* to 10*n* Objects
11 Driverless transport system
11*a* to 11*n* Driverless transport systems
12 Track guidance sensor
13 Integrated computing unit
14 Driverless transport system control system
15 Driverless transport system route
16 Route elements
17*a* to 17*n* Production systems
18 Direction of travel
18*a* to 18*n* Directions of travel
19 Light-emitting means
19*a* to 19*n* Active light-emitting segments
20 Active light-emitting diode (LED)
21 Inactive light-emitting diode (LED)
22 LED travel track
23 Control device
24 Energy supply unit
25 Communication unit
26 Control unit
27 Position capture device
28 Control line
29 Field bus
30 Electrical conductor
31 Receiving diode
32 Transmitting diode
33 Energy supply, control and communication unit
33*a* to 33*n* Energy supply, control and communication units
34 Energy line
35 Data line

What is claimed is:

1. A method for operating a track guidance system including at least one floor element, comprising:
    planning at least one movement of at least one object on the at least one floor element;
    transmitting at least one control signal to the at least one object via a plurality of activatable markings on and/or in the at least one floor element, the plurality of activatable markings being individually activated and deactivated so as to form a signal pattern on and/or in the at least one floor element;
    coding information into the at least one control signal transmitted to the at least one object using the plurality of activatable marking elements by varying a flashing frequency of one or more of the activatable markings, the flashing frequency being greater than 1 Hz;
    reading the coded information with the at least one object, the information coded into the at least one control signal includes a signal corresponding to at least one of an upcoming turn direction, increase or decrease of speed, direction of travel, stop instruction, give way instruction, and destination reached information; and
    following activated markings of the plurality of activatable markings with the at least one object and following the signal of the information coded into the at least one control signal so as to carry out the planned at least one movement of the least one object.

2. The method according to claim 1, further comprising:
    capturing a position of the at least one object on the at least one floor element before planning the at least one movement of the at least one object; and planning the at least one movement based on the captured position.

3. The method according to claim 2, further comprising: capturing the position of the at least one object using at least one position capture device of the at least one floor element.

4. The method according to claim 2, further comprising: capturing the position of the at least one object using at least one position capture device located outside the at least one floor element.

5. The method according to claim 1, wherein the plurality of activatable markings comprises a matrix of activatable marking elements and/or a linear formation of activatable marking elements.

6. The method according to claim 1, wherein the transmitting of the at least one control signal includes transmitting the at least one control signal by emitting light from the plurality of activatable markings.

7. The method according to claim 6, wherein the plurality of activatable markings include individually activatable light-emitting diodes (LEDs) configured to emit the light.

8. The method according to claim 1, wherein the coding of the information further comprises changing a color of one or more of the activatable markings.

9. The method according to claim 1, further comprising: sensing the activated markings with a track guidance sensor of the at least one object.

10. The method according to claim 9, wherein the track guidance sensor includes at least one camera.

11. The method according to claim 9, wherein the activated markings form a travel track.

12. The method according to claim 11, wherein the travel track is formed by a moving light-emitting diode (LED) section of the plurality of activatable markings.

13. The method according to claim 12, wherein the object is configured such that a travel speed of the object corresponds to a speed of the moving LED section.

14. The method according to claim 1, wherein the varying of the flashing frequency includes varying the flashing frequency of an individual one of the plurality of activatable markings.

* * * * *